United States Patent

[11] 3,634,649

[72] Inventors Donald D. Rager;
 Robert L. Heflin; Dana V. Wilcox, all of Richmond, Va.
[21] Appl. No. 20,996
[22] Filed Mar. 19, 1970
[45] Patented Jan. 11, 1972
[73] Assignee Reynolds Metals Company
 Richmond, Va.

[54] APPARATUS FOR AND METHOD OF JOINING STRANDED CABLE
10 Claims, 13 Drawing Figs.

[52] U.S. Cl. .................................................. 219/137,
 29/628, 174/90
[51] Int. Cl. .................................................. B23k 9/00
[50] Field of Search .................................. 219/137,
 107, 104, 56; 29/624, 628, 630 F; 174/94, 90, 84;
 156/48, 49; 228/44

[56] References Cited
 UNITED STATES PATENTS

| 650,860 | 6/1900 | McTighe | 219/517 |
| 1,339,417 | 5/1920 | Pierce | 219/105 |
| 1,707,317 | 4/1929 | Pipes | 219/137 |
| 2,062,886 | 12/1936 | Jensen | 174/84 |
| 2,439,522 | 4/1948 | Miller | 219/137 X |
| 2,796,511 | 6/1957 | Steele | 219/57 X |
| 3,017,483 | 1/1962 | Anderson | 219/104 X |
| 3,138,656 | 6/1964 | Merrell | 174/84 |
| 3,165,617 | 1/1965 | Steele | 219/104 X |

Primary Examiner—R. F. Staubly
Assistant Examiner—George A. Montanye
Attorney—Glenn, Palmer, Lyne, Gibbs & Thompson ABSTRACT: Stranded cables are joined utilizing apparatus and method of this invention by coating individual strands of the end portions of the cables to be joined with a suitable cleaning liquid and then ejecting a fluid under pressure against such end portions to remove the liquid and any foreign particles from the end portions including forcing such particles along the length of the cable. The cleaned end portions are then fixed in an associated welding apparatus and welded together with a conventional welding device using an access port provided in the apparatus and the welding action provided assures that each cable strand is fused to the weld material. Any excess weld material is then removed from the welded end portions after removal from the welding apparatus and a tubular sleeve may be fixed in position over the welded junction to reinforce the high-strength weld.

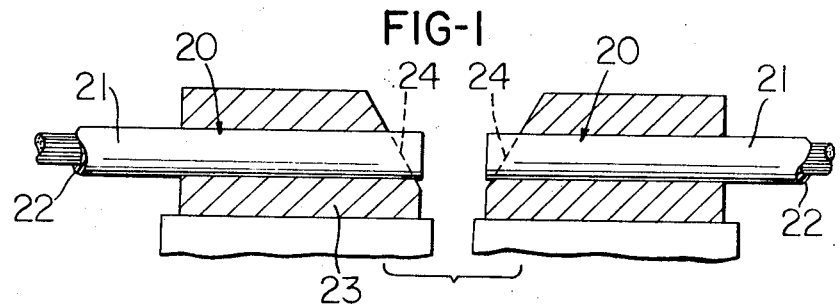
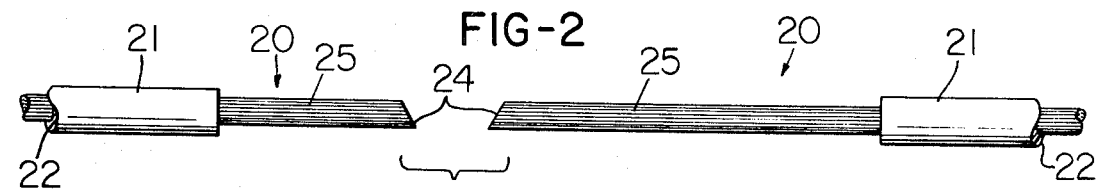
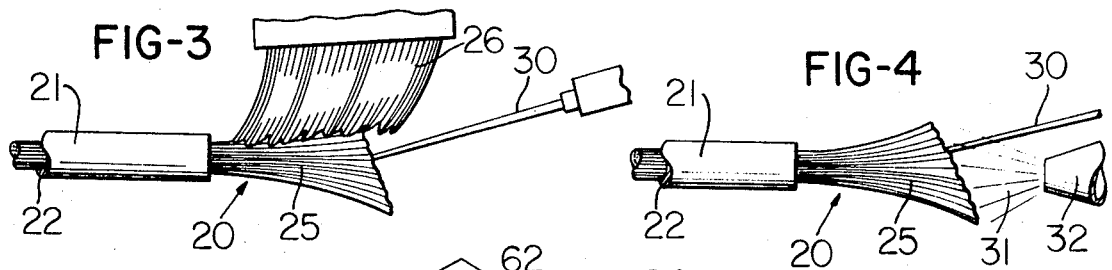
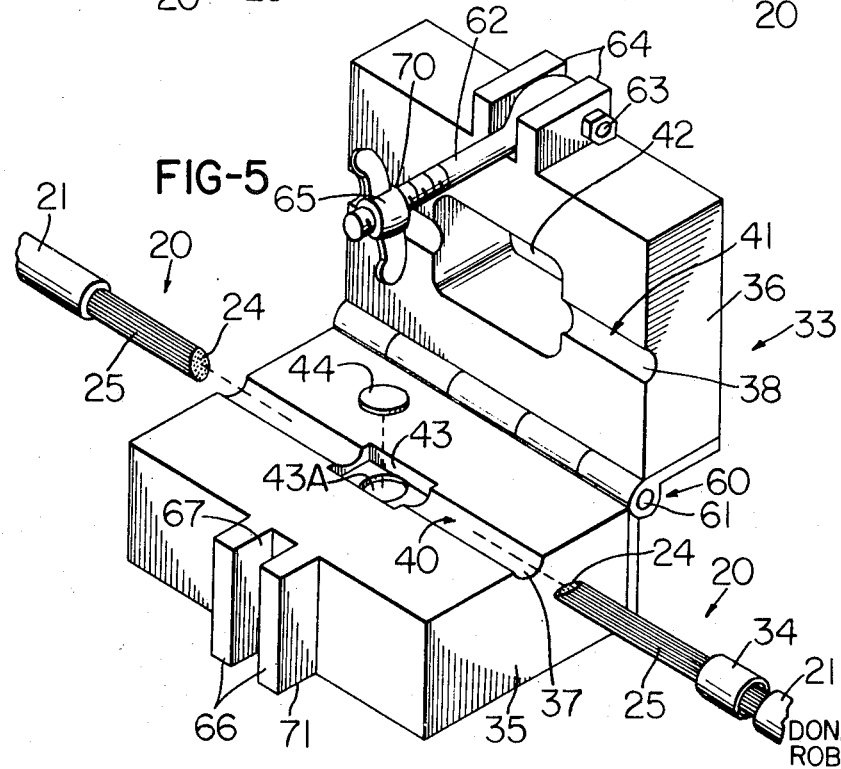

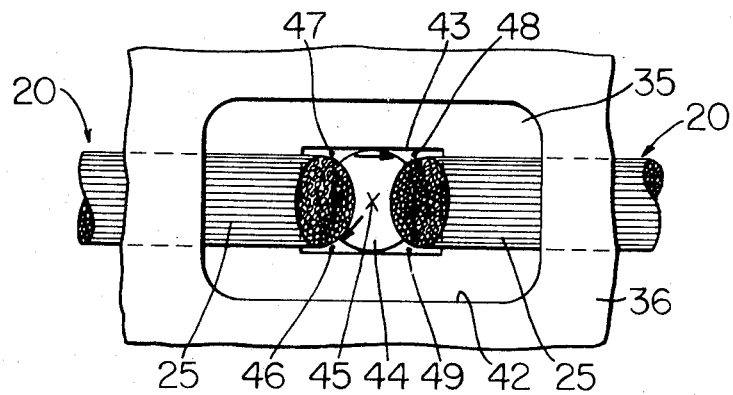
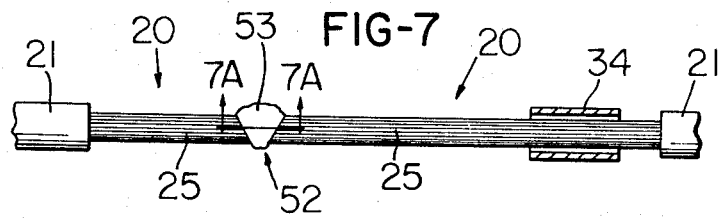
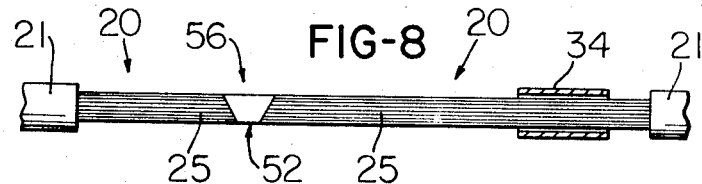
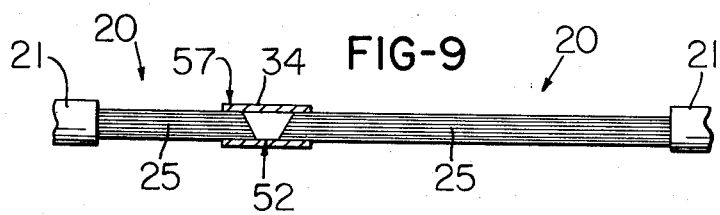
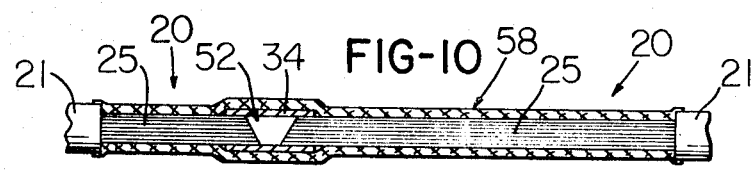

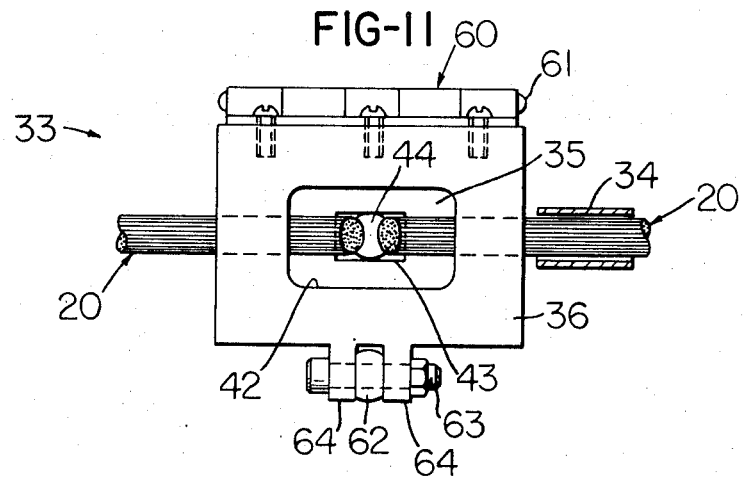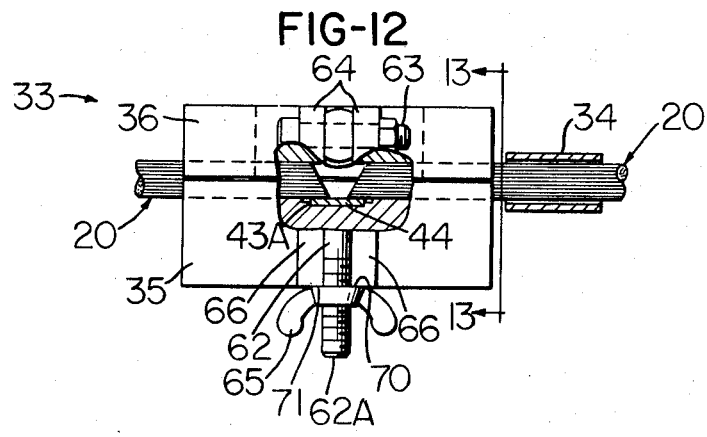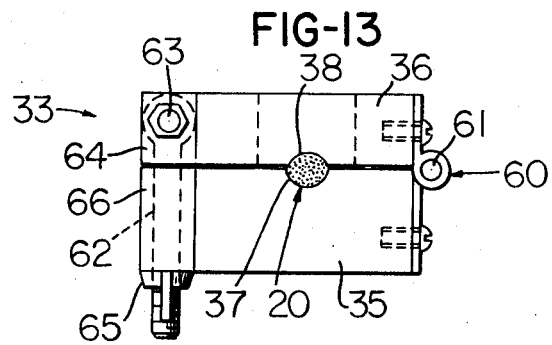

APPARATUS FOR AND METHOD OF JOINING STRANDED CABLE

BACKGROUND OF THE INVENTION

It is very difficult to weld associated end portions of stranded metal cables and particularly of stranded electrical power transmission cables made of metallic materials containing aluminum; and, the difficulty associated with welding stranded metal cables is further increased when the cable has been impregnated with an oil-dielectric. The techniques and apparatus proposed heretofore for welding such power transmission cables are inadequate in that the resulting junctions provided utilizing the present welding apparatus or techniques have low strength, have poor current carrying capacity, and are generally of the type that cannot be readily accomplished in the field.

SUMMARY

This invention provides an improved apparatus for and method of joining associated end portions of stranded metal cables such as electrical power transmission cables to provide a junction in each instance having high strength and improved current-carrying capacity. The technique of this invention requires coating of the individual strands of the end portions to be joined with a suitable cleaning liquid and ejecting a fluid under pressure against such end portions to remove such liquid and any impurities or foreign particles therefrom. The cleaned end portions are then fixed in an improved welding apparatus or fixture and welded together using an access port in such fixture with the welding action being achieved without damaging or burning away the individual strands of the cables while assuring that each strand is fused to the weld material. Excess weld material is then removed from the junction and in some applications a compression sleeve is fixed in position thereover to prevent flexing and fatiguing of the weld area and thereby increase the structural integrity of the junction.

Other details, uses, and advantages of this invention will become apparent as the following description of the exemplary embodiments thereof presented in the accompanying drawings proceeds.

BRIEF DESCRIPTION OF THE DRAWINGS

The accompanying drawings show present exemplary embodiments of this invention, in which FIG. 1 is a view with parts in cross section, parts in elevation, and parts broken away of a pair of associated end portions of stranded cables which are to be joined together utilizing the apparatus and method of this invention and particularly illustrating the manner in which the terminal ends of such end portions are to be cut to define beveled ends;

FIG. 2 is a view similar to FIG. 1 particularly illustrating the manner in which the end portions which are to be joined have electrical insulation removed therefrom;

FIG. 3 is a view of the end portion of the left cable and particularly illustrating the manner of applying a cleaning liquid to the individual strands of the cables;

FIG. 4 is a view similar to FIG. 3 and illustrating the manner of ejecting a fluid under high pressure against the end portion of the cable to remove the cleaning liquid and any foreign particles from the individual strands in the area to be welded;

FIG. 5 is a perspective view of one exemplary embodiment of the improved apparatus or fixture of this invention within which the end portion of the cleaned stranded cable illustrated in FIG. 4 and the end portion of the associated similarly cleaned stranded cable are held in a fixed position to enable welding thereof;

FIG. 6 is a plan view illustrating the end portions of the stranded cables in position within the fixture of FIG. 5 and showing one technique for welding such end portions in position;

FIG. 7 is a view in elevation illustrating the junction defined by welding the associated end portions together in the fixture of FIG. 5;

FIG. 8 is a view similar to FIG. 7 after removing excess weld material from the welded junction;

FIG. 9 is a view similar to FIG. 8 and illustrating a seamless sleeve which has been mechanically compressed in position over the welded junction;

FIG. 10 is a view similar to FIG. 9 illustrating electrical insulating material wrapped around the completed junction;

FIG. 11 is a top plan view of the fixture of FIG. 5;

FIG. 12 is a front view in elevation with parts broken away of the fixture showing the end portions of the cable to be welded fixed in position to enable welding thereof; and FIG. 13 is a view on the line 13—13 of FIG. 12.

DESCRIPTION OF ILLUSTRATED EMBODIMENTS

Reference is now made to FIG. 1 of the drawings which illustrates a pair of end portions 20 each comprising an associated stranded metal cable, such as stranded aluminum cable, used to transmit electrical power. Each cable 21 of this example is in the form of an electrically insulated cable which has a plurality of layers of oil impregnated paper wrapped therearound to define an electrically insulating cover 22. This invention provides a simple method and an associated welding apparatus or fixture, as will be described hereinafter, which enable associated end portions of stranded aluminum cables to be welded together in a high-strength manner in the field by workmen having ordinary skill.

With the insulation 22 fixed in position, a bevel 24 is formed in each end portion 20 and a length of insulation 22 is then stripped from each end portion in the manner illustrated in FIG. 2 of the drawings. In this example, the end portion 20 of the stranded aluminum cable shown at the right has a section of insulation of greater length removed or stripped therefrom and for a purpose to be subsequently described.

The bevel 24 in each end portion 20 is preferably formed by cutting using a suitable cutting device. In those applications where the weld is made in the field, each end portion 20 is preferably held in a holding device 23 and the bevel 24 is cut with an ordinary hacksaw.

Each bevel may be cut at any suitable angle; however, it has been found that an angle of 60 with the longitudinal axis of end portion 20 provides best results. In addition, by cutting the bevel 24 before the insulation 22 is removed, a substantially planar cut may be provided without deformation of the cable cross section.

After providing the bevel cut 24 in the end portion 20 of each stranded cable 21, the insulation 22 (which is comprised of a plurality of concentric layers of oil-impregnated paper) is removed therefrom as indicated in FIG. 2 of the drawings so that each end portion of each cable 21 is now in the form of a beveled and stripped end portion and for convenience and ease of presentation, each beveled and stripped end portion will also be referred to as end portion 20. To assure the provision of a high-strength junction which is capable of carrying current in an efficient manner, it is necessary that the end portions 20 be thoroughly cleaned prior to welding. The cleaning action will be described in connection with the stripped and beveled end portion 20 of the cable 21 shown as a left end portion in FIGS. 1 and 2 of the drawings; however, it will be appreciated that the same cleaning action is accomplished on the end portion of the associated right cable illustrated in FIG. 2.

Each stranded aluminum cable 21 and hence each end portion 20 is comprised of a plurality of individual strands 25. The cleaning is achieved as illustrated in FIGS. 3 and 4 by coating the individual strands 25 with a suitable cleaning fluid and this may be achieved by brushing the outside layers of the cable strands 25 with a suitable applicator such as a brush 26 which has been saturated with a cleaning or degreasing agent or liquid such as chlorothane. As the cleaning liquid is applied on the strands 25, a suitable spreading instrument such as an ice pick 30 is used to spread the strands apart and assure the entire surface of each strand 25 is coated with the cleaning liquid.

Once the individual strands 25 of end portion 20 have been coated, a suitable fluid such as nitrogen or dry air 31 is ejected at high pressure (generally in excess of 100 p.s.i.g.) through a nozzle 32 against such end portion and during such ejection of high-pressure air, the spreading instrument 30 is again used to spread the individual strands 25 apart. The high-pressure air 31 is directed against the terminal end of end portion 20 and inwardly along the length of the cable 21 whereby any foreign particles such as oil, dirt, metal chips, or the like on a particular strand 25 are either propelled therefrom or moved inwardly along the length of the cable away from the area where the welding action will take place.

The associated cleaned end portions 20 are then placed in a suitable welding apparatus or fixture 33 illustrated in FIG. 5 of the drawings and prior to placing the end portions within fixture 33 a metal compression sleeve 34 is slid axially inwardly along that end portion 20 which has the added length of insulation stripped therefrom so that the sleeve 34 remains outwardly of the fixture 33. The sleeve 34 may be made of any suitable metallic material; however, inasmuch as the stranded cables 21 are made of aluminum, the sleeve 34 is preferably made of a suitable aluminum alloy.

The fixture 33 is comprised of a lower jaw member 35 and an upper jaw member 36 provided with outwardly concave substantially semicylindrical clamping surfaces 37 and 38 respectively. The surface 37 defines a groove 40 in member 35 while the surface 38 defines a groove 41 in the member 36. The grooves 40 and 41 cooperate to define a substantially cylindrical channel extending from one end of fixture 33 to the other and such channel is adapted to receive stripped and cleaned end portions 20 of the cables 21 to be joined while the surfaces 37 and 38 cooperate to provide optimum heat conductive contact of such end portions while holding the end portions firmly in the fixture upon fastening the jaw members 35 and 36 together.

The upper jaw member 36 has an access opening 42 provided therein which is sufficiently large to enable a welding device to be inserted therethrough to weld the end portions 20 together, see FIGS. 5 and 6. The lower member 35 has a well 43 provided therein which communicates with its grove 40 and the lower member also has a recess 43A defining the lower portion of the well 43.

Prior to placing the end portions 20 in position in the fixture 33, an aluminum disclike slug 44 of oval or circular peripheral outline is placed in the recess 43A and the slug 44 is used as an arc-starting member and supplies additional filler metal at the root of the weld. The members 35 and 36 are then suitably fixed together with the end portions 20 arranged so that their beveled ends face upwardly and are readily visible and accessible through the access opening 42.

A suitable welding device, such as a gas-metal-arc welding device (i.e., a GMA torch) is used to electric-arc weld the end portions 20 together. The welding sequence is illustrated in FIG. 6 and the welding arc is started at 45 using the aluminum slug 44 and moved rapidly to position 46. The welding slug 44 eliminates the necessity of establishing the arc on the fixture 33 to thereby assure such fixture is not welded to the end portions 20; further, it will be appreciated that the arc should not be established on the cable strands to prevent unnecessary damage by burning away of cable strands.

The arc is allowed to dwell at position 46 for a sufficient time interval to permit weld metal to flow under and fuse the strands 25 of the left-end portion 20. As the weld metal begins to build up at corner position 46, the arc is moved across the root of the left-end portion 20 to position 47 where it is again allowed to dwell until weld metal fuses the adjoining strands 25. The arc is then moved to position 48 and when weld metal begins to again build up and fuses adjoining strands 25 of the right-end portion 20, the arc is moved to position 49 and again allowed to dwell a sufficient time for weld metal to build up and fuse adjoining strands 25.

The movement of the welding arc is repeated in a substantially oval pattern from positions 46 through 49 and preferably without stopping until weld metal has been built up over the entire height of the cable end. During this welding action, care is taken to assure that the arc does not dwell on individual cable strands while assuring that molten weld material flows between such strands, whereby a high-strength joint or junction is provided and designated by the reference numeral 52 in FIG. 7 of the drawings.

The junction 52 is comprised of a weld nugget 53 of roughly V-shaped configuration as viewed from a side thereof. The weld material adheres to the cleaned cable strands, forming a homogeneous weld splice. In addition, the weld metal surrounds each strand of each end portion partially melting some of the outer surface portions of each strand so that each strand is at least partially embedded within an associated irregular end portion of the weld nugget 53. Thus, the junction 52 is of high strength and the electrical characteristics of such junction are at least as good as or better than an equivalent longitudinal section of unwelded cable 21.

The excess weld material around the junction 52 illustrated in FIG. 7 is removed by any suitable technique such as filing, sanding, grinding, or the like, with care being taken to assure that the cable strands are not nicked during this finishing of the junction 52 and the metal cable strands 25 are not overheated. The finishing or dressing action is achieved until the outside diameter of the junction 52 is substantially equal to the outside diameter of the now joined end portions 20 as shown at 56 in FIG. 8.

The sleeve 34 is then moved axially so that the center thereof coincides with the center of the welded junction 52 and such sleeve is then suitably radially compressed inwardly utilizing any suitable device such as a press capable of exerting great forces to provide added strength for the welded junction 52. The sleeve 34 extends outwardly of the junction 52 for substantial distances as indicated at 57 and assures that the junction 52 will not be unnecessarily flexed so as to cause weakening thereof.

After careful removal of any burns that may be present on the sleeve or in the vicinity thereof, the junction 52 is wrapped with a suitable electrical insulating material and this example of the junction has a section 58 of oil-impregnated paper wrapped around junction 52. The section 58 provides complete electrical insulation over the entire exposed end portions 20 and overlaps the terminal ends of the layers of the insulation remaining on cables 21 to assure provision of a continuous high-quality electrical insulating sleeve.

Having described an improved method of welding stranded aluminum cable, the detailed description will now proceed with a more detailed description of the apparatus or fixture 33, see FIGS. 5, 6, and 11–13, which may be utilized to assure that such method is satisfactorily accomplished. The fixture 33 is comprised of lower jaw member 35 and upper jaw member 36 as previously mentioned and such members are suitably fastened together by a hinge assembly 60. The hinge assembly 60 has component portions suitably fixed to the members 35 and 36 and is provided with a removable hinge pin 61 which enables the members 35 and 36 to be separated upon removal of the hinge pin 61 from the assembly 60.

The fixture 33 also has a fastening device which is easily fastened and unfastened and is arranged to fasten the members together at a location opposite the hinge assembly and such fastening device is comprised of an eye bolt 62 having a plain or smooth upper end supported for pivoting movements by a pivot pin 63 which is supported by a pair of lugs 64 extending outwardly from the front face of the upper jaw member 36. The eye bolt 62 also has a threaded lower or swinging end portion 62A which has a nut in the form of a threaded wing nut 65 threaded thereon in a known manner.

The member 35 has a pair of spaced projections 66 extending outwardly from its front face and defining a slot or groove 67 therebetween which is adapted to receive the eye bolt 62 therein and once the end portions 20 have been suitably installed within the longitudinal channel in the fixture 33 defined by grooves 40 and 41 the wing nut 65 is tightened to thereby clamp its inside surface 70, see FIG. 12, against the lower surfaces 71 of the projections 66 whereby the jaw members 35 and 36 are held together in an optimum manner and with the surfaces 37 and 38 clamped on opposite sides of end portions 20 with a small gap or space between jaw members 35 and 36 which assures surfaces 37 and 38 provide optimum heat-conductive contact against end portions 20.

As will be apparent from FIGS. 6 and 12 of the drawings, the recess 43A in lower member 35 is particularly adapted to receive the metal disc or slug 44 therewithin to enable establishing an arc for electric arc welding of the end portions 20 of the two illustrated cables 21 together. The recess 43A is sufficiently deep that the lower surfaces of end portions 20 are held substantially in a common plane and hence are not deflected upwardly, with the slug 44 in position. In one exemplary fixture of this invention used to weld ⅝-inch stranded aluminum cable, the recess 43A is of sufficient depth and cross-sectional area to readily receive an 11/16-inch diameter slug three thirty-seconds inch thick.

The access opening 42 provided in the upper member 36 is of sufficient size to enable the tip of a GMA torch to be inserted therein without obstruction from the fixture 33 and thereby enables welding by utilizing the substantially elliptical or oval motion provided by moving in the oval path from points 46 through 49 in the manner previously described and without obstruction by the upper jaw member 36.

The use of welding fixture 33 assures that heat is concentrated in the area where the welding action is desired and because of the firm heat-conductive contact of surfaces 37 and 38 against end portions 20, heat is conducted rapidly away from end portions 20 at locations immediately adjacent the weld area. To further assure this rapid conduction of heat away from the weld area the access opening 42 and well 43 are precisely defined. Further, the well 43 is made having a width which is sufficient to allow weld metal to flow completely around end portions 20 to form a pool of weld metal and having a length which is sufficient to allow weld metal to flow between individual strands yet is short enough to assure the clamping surfaces 37 and 38 engage enough of end portions 20 to provide optimum conduction of heat away from such end portions.

In some applications of this invention it may be desired to add cooling fins on the fixture 33 adjacent the opposite ends thereof to assure that the heat is dissipated rapidly away from such fixture; and, in other applications, it may be desirable to cool the fixture by utilizing a suitable coolant such as water, a refrigerant, or the like.

It will also be appreciated that suitable techniques may be utilized to rapidly cool and maintain in a cooled condition the end portion of each cable 21 adjacent the point where the insulation 22 starts after defining stripped end portion 20. This assures that any insulating oil, or the like, comprising the oil-impregnated paper insulating layers will be presented from running back along the clean individual strands 25 during the welding action whereby optimum welding efficiency is provided.

The welding fixture 33 may be made of any suitable highly heat-conductive metallic material. To prevent welding the end portions 20 to the fixture, the metallic material used to make the fixture should be different than the metal comprising the cable ends being welded. For example, in welding end portions made of copper a steel fixture would be preferable and in welding aluminum cable ends any heat conductive metallic material other than aluminum would be preferred.

The above presents a detailed description of the welding of a stranded aluminum electrical power transmission cable; however, it will be appreciated that the method described above and the fixture 33 may be used to weld other stranded cables made of other materials, such as copper or steel, for example, and irrespective of whether such stranded cables are used as power transmission cables or other types of cables.

As previously indicated, the welding device which is preferred in practicing the method of this invention is a gas-metal-arc welding device. However, it will also be appreciated that other welding devices may be used, such as gas-tungsten-arc devices, plasma-arc devices, oxyacetylene devices, etc. In addition, it will be appreciated that with arc welding devices, various types of power supplies may be utilized, including pulsed power supplies.

While present exemplary embodiments of this invention, and methods of practicing the same, have been illustrated and described, it will be recognized that this invention may be otherwise variously embodied and practiced within the scope of the following claims.

We claim:

1. A method of joining associated end portions of a pair of stranded cables comprising the steps of, cleaning said end portions, placing said cleaned end portions on a lower jaw member of a heat-conductive welding apparatus with the terminal ends of said end portions in axially aligned spaced relation over a well in said lower member, clamping an upper member of said apparatus against said end portions to achieve optimum heat-conductive contact and with an access opening in said upper member vertically aligned over said well, inserting a welding device through said access opening, welding said end portions together with said welding device by forming a pool of welding material in said well, said welding material also flowing between individual strands of said end portions to assure welding material fuses adjacent strands to define a weld nugget and a junction having high strength, said clamping step assuring that during said welding step heat is conducted rapidly away from said junction and reduces the tendency for said end portions to burn back, and cleaning any excess weld material from the welded junction after removal from said apparatus.

2. A method as set forth in claim 1 in which said cleaning step comprises coating individual strands comprising said end portions with a cleaning liquid while separating said strands to assure said liquid contacts the outside surface of each strand.

3. A method as set forth in claim 2 in which said cleaning liquid comprises a degreasing liquid and comprising the further step of ejecting a fluid against the terminal end of each end portion while directing said fluid inwardly along the length of the associated cable to force any foreign particles on the individual strands comprising each end portion away therefrom.

4. A method as set forth in claim 2 particularly adapted for joining said end portions of insulated electrical power transmission cables comprising the preparation steps of cutting a bevel at the terminal end of each end portion and then removing a length of insulation from each end portion and comprising the further step of ejecting air under pressure against the terminal end of each end portion while directing said air inwardly along the length of the associated cable.

5. A method as set forth in claim 1 for welding said associated end portions of stranded aluminum cables wherein said welding step comprises forming a pool of molten aluminum welding metal between said individual strands of said end portions to assure said fusing of adjacent strands and forming of said weld nugget.

6. A method as set forth in claim 5 in which said inserting step comprises inserting said welding device in the form of a gas-metal-arc through said access opening.

7. A method as set forth in claim 5 and comprising the preparation step of placing an aluminum filler slug in said well said inserting step comprises inserting said welding device in the form of an electric-arc welding device through said access opening, and said welding step comprises first establishing an electric arc on said aluminum filler slug to enable forming said pool of welding material.

8. A method as set forth in claim 7 in which said welding step comprises moving said welding device so that said arc is continuously maintained and moved in an approximately oval path without dwelling on individual strands of said end portions until the entire junction is defined.

9. A method as set forth in claim 1 and comprising the further step of fixing a sleeve around the weld defining said junction to prevent flexing movements of said junction and thereby improve the structural integrity thereof.

10. A method as set forth in claim 9 in which said sleeve comprises a seamless sleeve and said fixing step comprises axially sliding said sleeve from a position spaced from said junction to a position in aligned relation thereover and then compressing said seamless sleeve in position in a suitable pressing device.

* * * * *